United States Patent
Dalmasso et al.

(10) Patent No.: US 12,430,414 B2
(45) Date of Patent: Sep. 30, 2025

(54) SYSTEM AND METHOD FOR GENERATING SYNTHETIC PROFILES FOR TRAINING BIOMETRIC VERIFICATION SYSTEMS

(71) Applicant: Microsoft Technology Licensing, LLC, Redmond, WA (US)

(72) Inventors: Emanuele Dalmasso, Moncalieri (IT); Claudio Vair, Borgone Susa (IT); Haydar Talib, Montreal (CA)

(73) Assignee: Microsoft Technology Licensing, LLC., Redmond, WA (US)

( * ) Notice: Subject to any disclaimer, the term of this patent is extended or adjusted under 35 U.S.C. 154(b) by 357 days.

(21) Appl. No.: 18/186,500

(22) Filed: Mar. 20, 2023

(65) Prior Publication Data

US 2024/0320312 A1      Sep. 26, 2024

(51) Int. Cl.
    *G06F 21/00*    (2013.01)
    *G06F 21/32*    (2013.01)
    *G10L 13/04*    (2013.01)

(52) U.S. Cl.
    CPC ............. *G06F 21/32* (2013.01); *G10L 13/04* (2013.01)

(58) Field of Classification Search
    CPC ......... G06F 21/32; G10L 13/04; G10L 17/26; G10L 17/04
    See application file for complete search history.

(56) References Cited

U.S. PATENT DOCUMENTS

| | | | | |
|---|---|---|---|---|
| 10,553,218 B2 * | 2/2020 | Khoury | ................... | G10L 17/04 |
| 11,711,216 B1 * | 7/2023 | Poh | ......................... | G06F 21/32 |
| | | | | 713/186 |
| 2015/0341349 A1 * | 11/2015 | Mandal | ................... | G06F 21/32 |
| | | | | 726/7 |
| 2019/0132343 A1 | 5/2019 | Chen et al. | | |
| 2021/0144008 A1 * | 5/2021 | Prager | ................ | G06V 40/1382 |
| 2021/0201003 A1 | 7/2021 | Banerjee et al. | | |
| 2021/0326421 A1 * | 10/2021 | Khoury | ................... | G10L 17/08 |
| 2022/0126864 A1 | 4/2022 | Moustafa et al. | | |
| 2023/0131359 A1 * | 4/2023 | Talib | ....................... | G10L 17/02 |
| | | | | 704/246 |
| 2023/0267192 A1 * | 8/2023 | Mesrsmid | ............... | G06F 21/45 |
| | | | | 726/6 |

(Continued)

FOREIGN PATENT DOCUMENTS

| | | |
|---|---|---|
| CN | 108628993 A | 10/2018 |
| WO | 2019090769 A1 | 5/2019 |

OTHER PUBLICATIONS

Gomez-Barrero, et al., "Reversing the irreversible: A survey on inverse biometrics", Computers & Security, vol. 90, Mar. 2020, 18 pages.

(Continued)

*Primary Examiner* — William A Corum, Jr.
(74) *Attorney, Agent, or Firm* — Foley IP Law, PLLC

(57) ABSTRACT

A method, computer program product, and computing system for generating a statistical model representative of a plurality of natural biometric profiles, wherein each natural biometric profile is associated with an individual. A model of variability in the natural biometric profile associated with an individual is generated. A plurality of synthetic biometric profiles are generated using a plurality of random samples generated from the statistical model and the model of variability in the natural biometric profile associated with an individual.

20 Claims, 12 Drawing Sheets

(56) References Cited

U.S. PATENT DOCUMENTS

2025/0028859 A1* 1/2025 Huver ................ G06F 21/6254

OTHER PUBLICATIONS

International Search Report and Written Opinion received for PCT Application No. PCT/US2024/019303, Jul. 19, 2024, 14 pages.
Mai, et al., "On the Reconstruction of Face Images from Deep Face Templates", IEEE Transactions on Pattern Analysis and Machine Intelligence, vol. 41, Issue 5, Apr. 16, 2018, pp. 1188-1202.
Turner, et al., "Generating identities with mixture models for speaker anonymization", Computer Speech & Language, vol. 72, Mar. 2022, pp. 1-26.

* cited by examiner

SYSTEM AND METHOD FOR GENERATING SYNTHETIC PROFILES FOR TRAINING BIOMETRIC VERIFICATION SYSTEMS

BACKGROUND

The goal of a biometric verification system is to produce recognition scores that measure the likelihood that a biometric profile (e.g., a voiceprint) and an unknown biometric sample or segment belong to the same individual. For instance, in a speaker verification system, the recognition score is compared to a predefined threshold for deciding if a voiceprint and the target speech segment are from the same person. To train a biometric verification system, labelled biometric data is provided to the biometric verification system. However, conventional techniques expose sensitive biometric information in the form of training data in ways that are not permissible by laws, policies, or the interests of the entities and individuals.

BRIEF DESCRIPTION OF THE DRAWINGS

Like reference symbols in the various drawings indicate like elements.

DETAILED DESCRIPTION OF THE PREFERRED EMBODIMENTS

As will be discussed in greater detail below, implementations of the present disclosure generate synthetic (i.e., artificial) biometric profiles from natural or actual biometric profiles that account for inter-speaker distribution among multiple speakers and intra-speaker variability for a particular speaker. Biometric profiles are representations of biometric information that are attributable to particular individuals. For example, biometric profiles include voiceprints, face prints, retinal scans, fingerprints, conversation prints (i.e., a behavioural biometric based upon an individual's unique use of language (e.g., usual vocabulary and expressions)), or any other biological feature that uniquely identifies a particular individual or person. As noted above, biometric verification systems are trained using existing biometric profiles. However, conventional techniques expose sensitive biometric information in the form of training data in ways that are not permissible by laws, policies, or the interests of the entities and individuals.

In some implementations, the present disclosure uses a statistical model generated from a plurality of natural biometric profiles to generate synthetic biometric profiles with the same distribution of biometric characteristics as the plurality of natural biometric profiles and variability of the biometric characteristics for a particular individual. By generating new synthetic biometric profiles via the statistical model with biometric characteristic-offsets projected around each new synthetic profile, natural or actual biometric data is not exposed or retained but is represented through synthetic profiles. In this manner, biometric profiles of real individuals with actual variability in their biometric characteristics are transformed to enhance the training of biometric verification systems.

The details of one or more implementations are set forth in the accompanying drawings and the description below. Other features and advantages will become apparent from the description, the drawings, and the claims.

The Synthetic Profile Generation Process:

Referring also to FIGS. 1-12, synthetic profile generation process 10 generating 100 a statistical model representative of a plurality of natural biometric profiles, wherein each natural biometric profile is associated with an individual. A model of variability in the natural biometric profile associated with an individual is generated 102. A plurality of synthetic biometric profiles are generated 104 using a plurality of random samples generated from the statistical model and the model of variability in the natural biometric profile associated with an individual.

Figure 1:
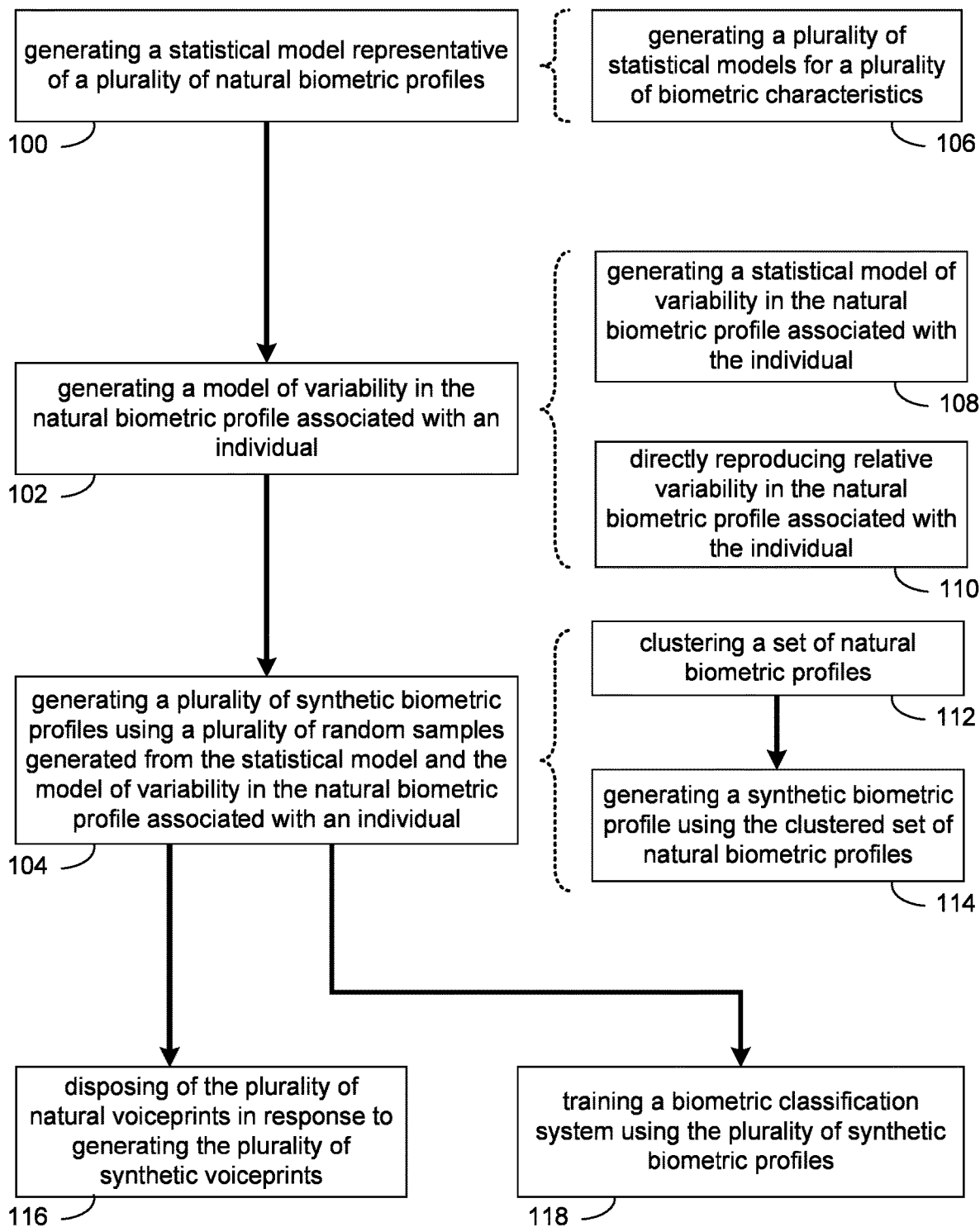
FIG. 1 is a flow chart of one implementation of the synthetic profile generation process.
Figure 2:
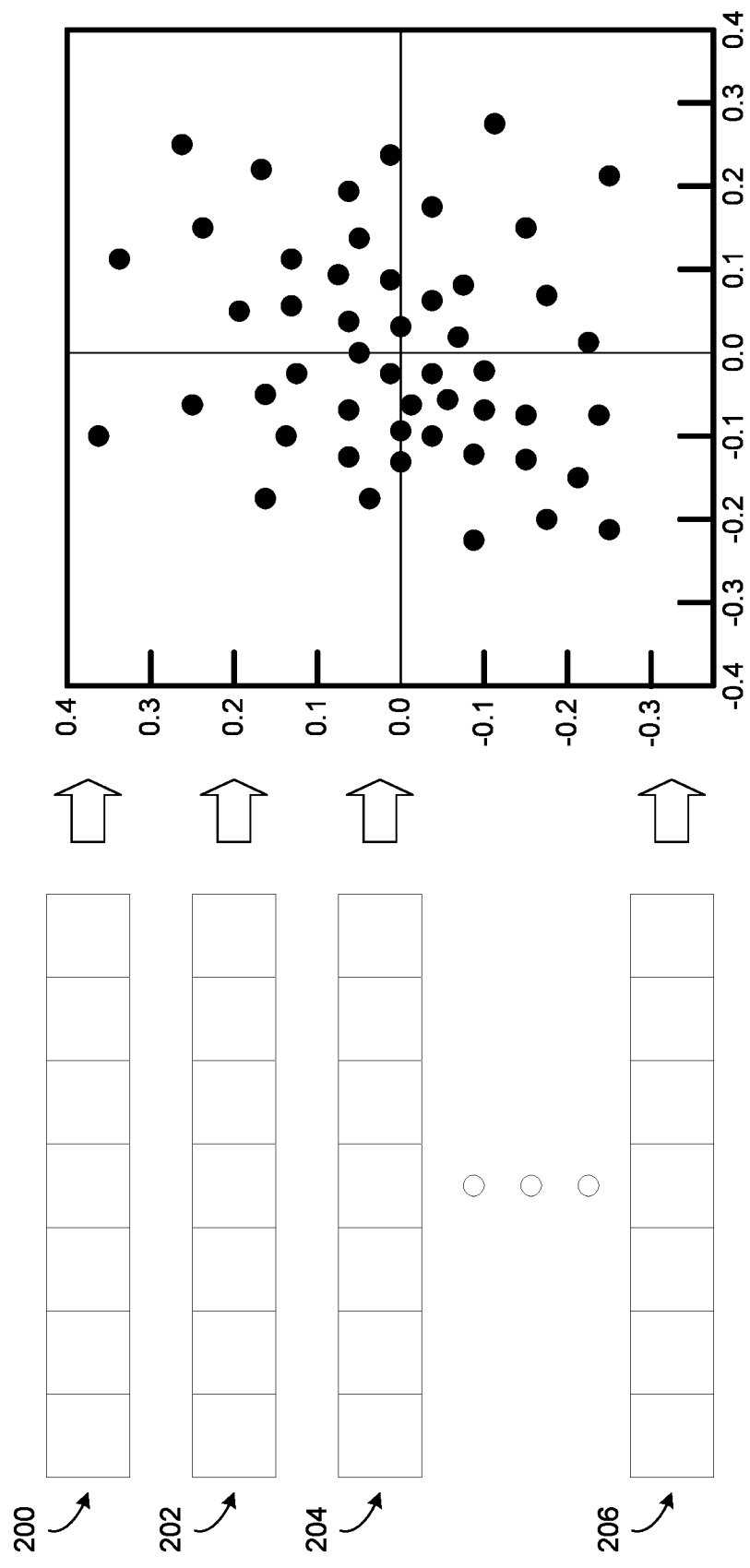
FIG. 2 is a diagrammatic view of a plurality of natural biometric profiles.

In some implementations, synthetic profile generation process 10 generates 100 a statistical model representative of a plurality of natural biometric profiles. As discussed above, a biometric profile is a representation of biometric information that uniquely identifies a particular individual or person. For example, biometric profiles include voiceprints, face prints, retinal scans, fingerprints, or any other biological feature that uniquely identifies a particular individual or person. A natural biometric profile is a biometric profile attributable to a real person. In some implementations, a natural biometric profile includes a vector of biometric information associated with an individual. Referring also to FIG. 2, a plurality of natural biometric profiles are shown (e.g., biometric profiles 200, 202, 204, 206). In some implementations, biometric profiles 200, 202, 204, 206 are vectors of biometric information. In one example, biometric profiles 200, 202, 204, 206 are voiceprints of particular individuals. In some implementations, the vectors are "i-vectors" that are extracted from speech signals from an individual. An i-vector or intermediate vector is a representation of a speech signal generated by extracting and processing particular signal features from the speech signal. In another example, the vectors are "x-vectors" which are embeddings extracted with a neural network or other machine learning models. In this manner, biometric profiles may be compared and evaluated using a vector representation. For example and as shown in FIG. 2, biometric profiles 200, 202, 204, 206 are represented as individual points within the graph of biometric profiles. As will be discussed in greater detail below, synthetic profile generation process 10 uses the distribution of biometric profiles 200, 202, 204, 206 to generate a statistical model and for generating synthetic biometric profiles.

In some implementations, synthetic profile generation process 10 generates 100 a statistical model representative of the plurality of natural biometric profiles. A statistical model is a statistical model of the joint probability distribution on a given observable variable (e.g., "X") and a target variable (e.g., "Y"). Specifically, a statistical model describes how a dataset is generated, in terms of a probabilistic model. By sampling from this model, new data is generated. Examples of statistical models include a multivariate Gaussian distribution, a Gaussian Mixture Model, Bayesian networks, Markov random fields, Hidden Markov Models (HMMs), Generative Adversarial Networks (GANs), etc. Referring also to the example of FIG. 3, synthetic profile generation process 10 generates a statistical model (e.g., statistical model 300 shown with concentric rings defining the distribution of natural biometric profiles in a graph of biometric profiles) representative of the distribution of natural biometric profiles 200, 202, 204, 206. In this example, statistical model 300 defines the distribution of the plurality of natural biometric profiles for particular variables or parameters.

In some implementations, generating 100 the statistical model includes generating 106 a plurality of statistical models for a plurality of biometric characteristics. As discussed above, biometric profiles associate specific biometric information with particular individuals for various biometric characteristics. Biometric characteristics are defined for various types of biometric information. For the example of voice/speech biometrics, the plurality of biometric characteristics include a plurality of voice/speech characteristics. In one example, the plurality of voice characteristics include speaker age, speaker language, and/or speaker gender. For instance, these voice characteristics may impact the distribution of particular biometric profiles. Suppose the plurality of biometric profiles include 50% English speakers and 50% German speakers. In this example, the voice characteristics resulting from different languages may introduce distinct distributions in the plurality of biometric profiles. Accordingly, synthetic profile generation process 10 generates 100 a plurality of statistical models (e.g., a statistical model for English speakers and a statistical model for German speakers).

In another example, suppose that the plurality of biometric profiles include 33% speakers with ages ranging from 18-30 years old, 33% speakers with ages ranging from 31-50 years old, and 33% speakers with ages ranging from 51-75 years old. In this example, the voice characteristics resulting from different ages may introduce distinct distributions in the plurality of biometric profiles. Accordingly, synthetic profile generation process 10 generates 106 a plurality of generative modes (e.g., a statistical model for 18-30 year old speakers, a statistical model for 31-50 year old speakers, and a statistical model for 51-75 year old speakers).

In some implementations, synthetic profile generation process 10 generates 100 a statistical model for a plurality of biometric profiles with multiple biometric characteristics. In one example, suppose that the plurality of biometric profiles include fingerprints from individuals with ages ranging from 18-30 years old and from individuals of one gender. In this example, synthetic profile generation process 10 generates a statistical model specifically for these individuals with multiple, known biometric characteristics (e.g., 18-30 years old and a single gender). In this manner, synthetic profile generation process 10 generates 100 a statistical model that accounts for multiple biometric characteristics.

In some implementations, synthetic profile generation process 10 generates a plurality of random samples from the statistical model. A random sample from the statistical model is any value or combination of values (e.g., a vector of biometric information) that adheres to the distribution of values of the statistical model. In some implementations, each random sample is a synthetic centroid. For example and referring also to FIG. 4, synthetic profile generation process 10 generates a plurality of random samples (e.g., plurality of random samples 400) from statistical model 300 that have the same distribution of values as statistical model 300. In this manner, plurality of random samples 400 hold the same statistical characteristics as the plurality of natural biometric profiles but do not include the same biometric information as the plurality of natural biometric profiles.

In some implementations, synthetic profile generation process 10 generates 102 a model of variability in the natural biometric profile associated with an individual. A model of variability is a representation of the variations in biometric characteristics associated of a natural biometric profile for an individual. For example, suppose multiple biometric profiles are associated with the same individual. As each biometric profile can include distinct biometric characteristics, the variability in these biometric characteristics are modeled to more accurately represent a particular individual. Ideally, a single individual should have a unique biometric profile, but this is not true in practice because 1) variation due to voice aging or physical/health conditions of the individual; and 2) limits of the biometric measurement techniques so that speaking style, noise, channel, environment, etc., may affect the estimated biometric profile. Accordingly, these variations are modeled in a model of the variability in the natural biometric profile associated with an individual.

Figure 5:
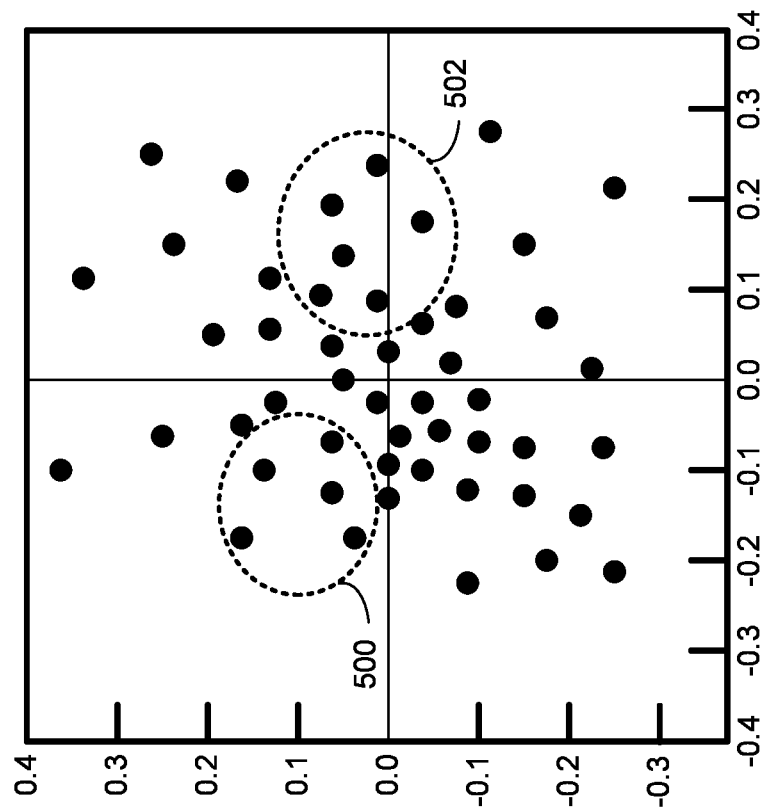
FIGS. 5-7 are diagrammatic views of models of variability of natural biometric profiles in accordance with various implementation of the synthetic profile generation process.

Referring also to FIG. 5, suppose that a plurality of biometric characteristics are represented graphically as unique points. In this example, a collection or set of biometric profiles (e.g., set of biometric profiles 500) are associated with the same individual. In this manner, set of biometric profiles 500 represent various biometric characteristics for a particular individual. Similarly, suppose that a set of biometric characteristics (e.g., set of biometric profiles 502) are associated with another individual. Accordingly, set of biometric profiles 500 represent the variability of the biometric characteristics for that individual. In some implementations, set of biometric profiles 500 are a set of vectors (e.g., I-vectors, X-vectors, embeddings, etc.) generated around a synthetic centroid as described above using the statistical model representative of a plurality of natural biometric profiles.

Figure 6:
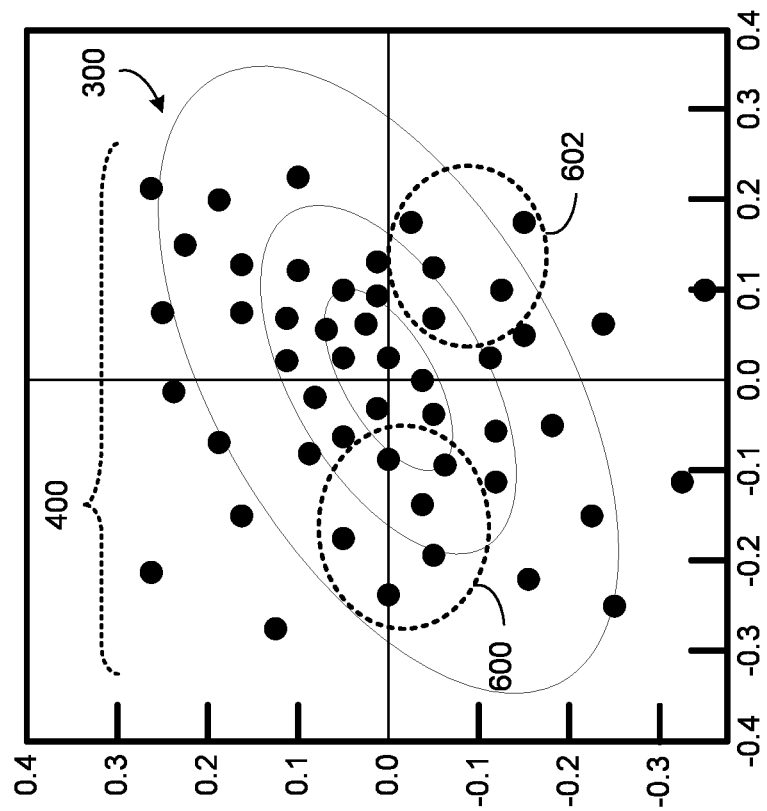

In some implementations, generating 102 the model of the variability in the natural biometric profile associated with an individual includes generating 108 a statistical model of variability in the natural biometric profile associated with the individual. Referring also to FIG. 6 and as discussed above, synthetic profile generation process 10 generates 108 a statistical model of variability (e.g., statistical model of variability 600 shown as a circle defining a distribution of the biometric characteristics of the natural biometric profile) for a particular individual in a graph of biometric profiles. In this example, statistical model of variability 600 defines the distribution of the variability in biometric characteristics of the natural biometric profile for a particular individual over particular variables or parameters. As shown in FIG. 6, statistical model of variability 600 includes the same distribution of biometric profiles for a particular individual and statistical model of variability 602 includes the same distribution of biometric profiles for another individual.

In some implementations, synthetic profile generation process 10 generates a model of variability of each natural biometric profile associated with each unique individual. For example, suppose the plurality of natural biometric profiles includes natural biometric profiles representative of four individuals. In this example, synthetic profile generation process 10 generates 102 a model of variability in the natural biometric profiles associated with each of the four individuals. In this manner, as will be discussed in greater detail below, a combination of statistical model 300 representing the distribution of natural biometric profiles and statistical models 600, 602 representing speaker-specific variability in biometric profiles, synthetic biometric profiles are generated that include inter-user and intra-user biometric relationships without exposing actual biometric information.

Figure 3:
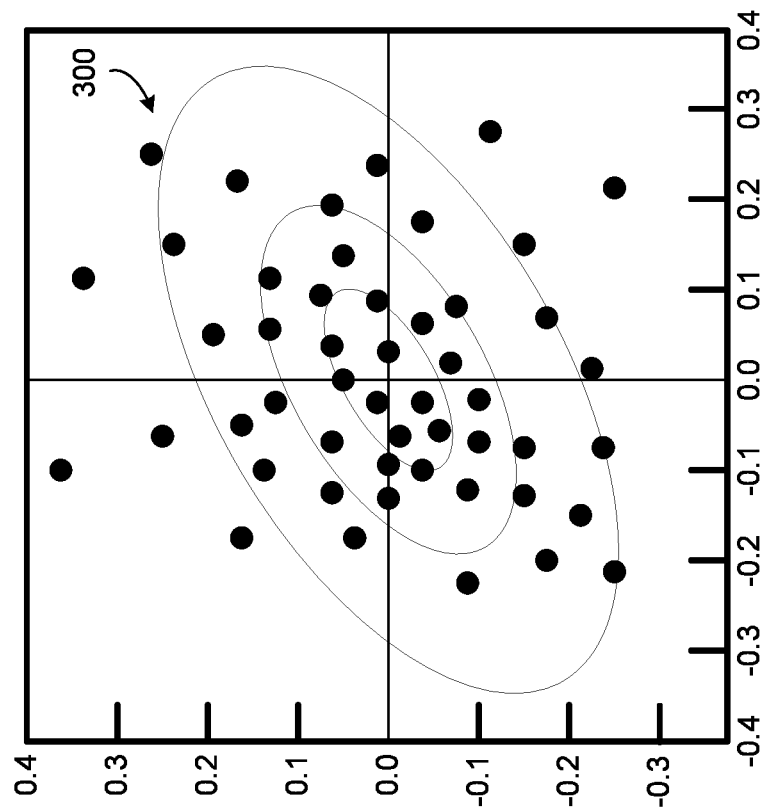
FIG. 3 is a diagrammatic view of a statistical model generated in accordance with one implementation of the synthetic profile generation process.
Figure 4:
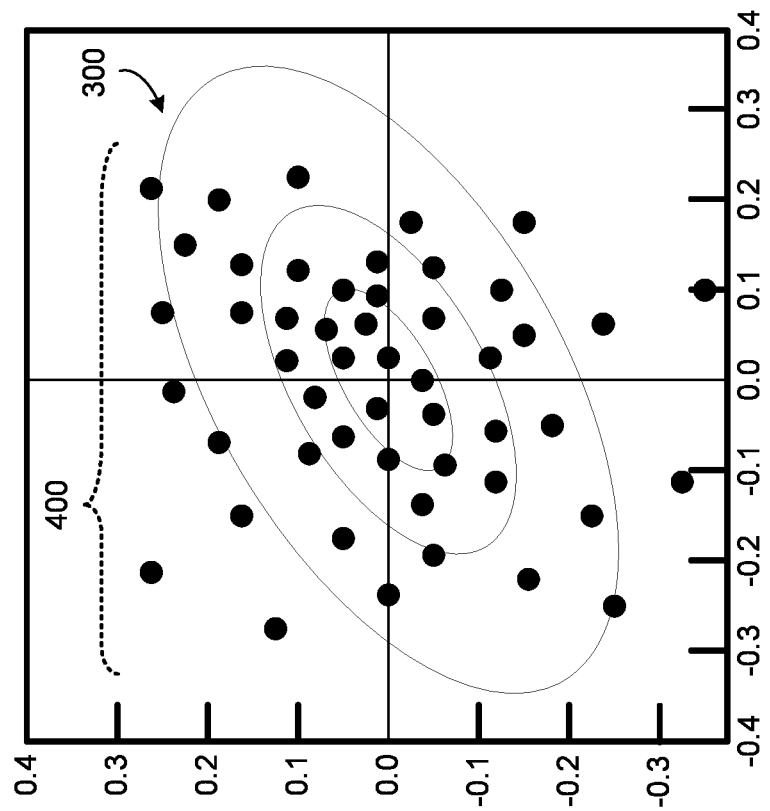
FIG. 4 is a diagrammatic view of a plurality of random samples generated in accordance with one implementation of the synthetic profile generation process.
Figure 7:
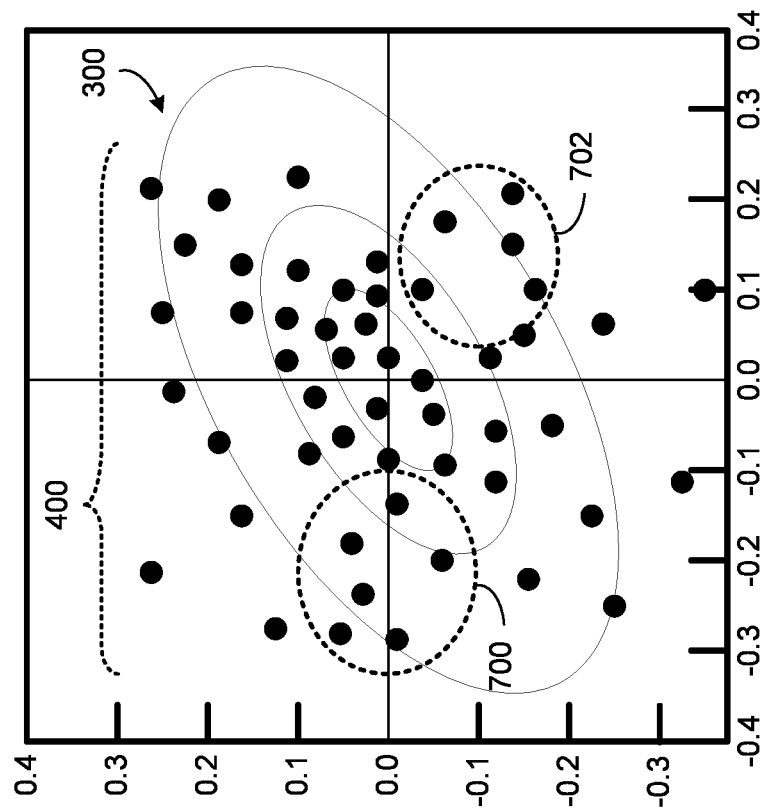

In another example, synthetic profile generation process 10 generating 102 the model of the variability in the natural biometric profile associated with an individual includes directly reproducing 110 a relative variability in the natural biometric profile associated with the individual. Referring also to FIG. 7 and as discussed above, synthetic profile generation process 10 generates 102 a model of variability (e.g., model of variability 700 shown as a circle defining the same graphical relationship) between biometric profiles for a particular individual. In this example, model of variability 700 includes the same relative variability (e.g., relative orientation and position in graph of FIG. 7) as shown in FIG. 3 for one individual. Similarly, model of variability 702 includes the same relative variability (e.g., relative orientation and position in graph of FIG. 7) as shown in FIG. 3 for another individual.

In some implementations, synthetic profile generation process 10 generates 104 a plurality of synthetic biometric profiles using a plurality of random samples generated from the statistical model and the model of variability in the natural biometric profile associated with an individual. Synthetic biometric profiles are artificial biometric profiles that have biometric information that is not associated with a real person. As such, symmetric biometric profiles can be used with a biometric verification system without exposing any of the biometric information of the plurality of natural biometric profiles. In some implementations, generating 104 the plurality of synthetic biometric profiles includes converting the plurality of random samples and model of variability into a plurality of synthetic biometric profiles. In some implementations, synthetic profile generation process 10 generates the plurality of synthetic biometric profiles by generating a plurality of random samples which each define a synthetic biometric profile and modeling the variability of natural biometric profiles for an individual user. In this manner, by generating a plurality of random samples from the statistical model and by generating a model for the variability in natural biometric profiles, synthetic profile generation process 10 generates a plurality of synthetic biometric profiles that represent the inter-user and intra-user relationships between natural biometric profiles.

Figure 8:
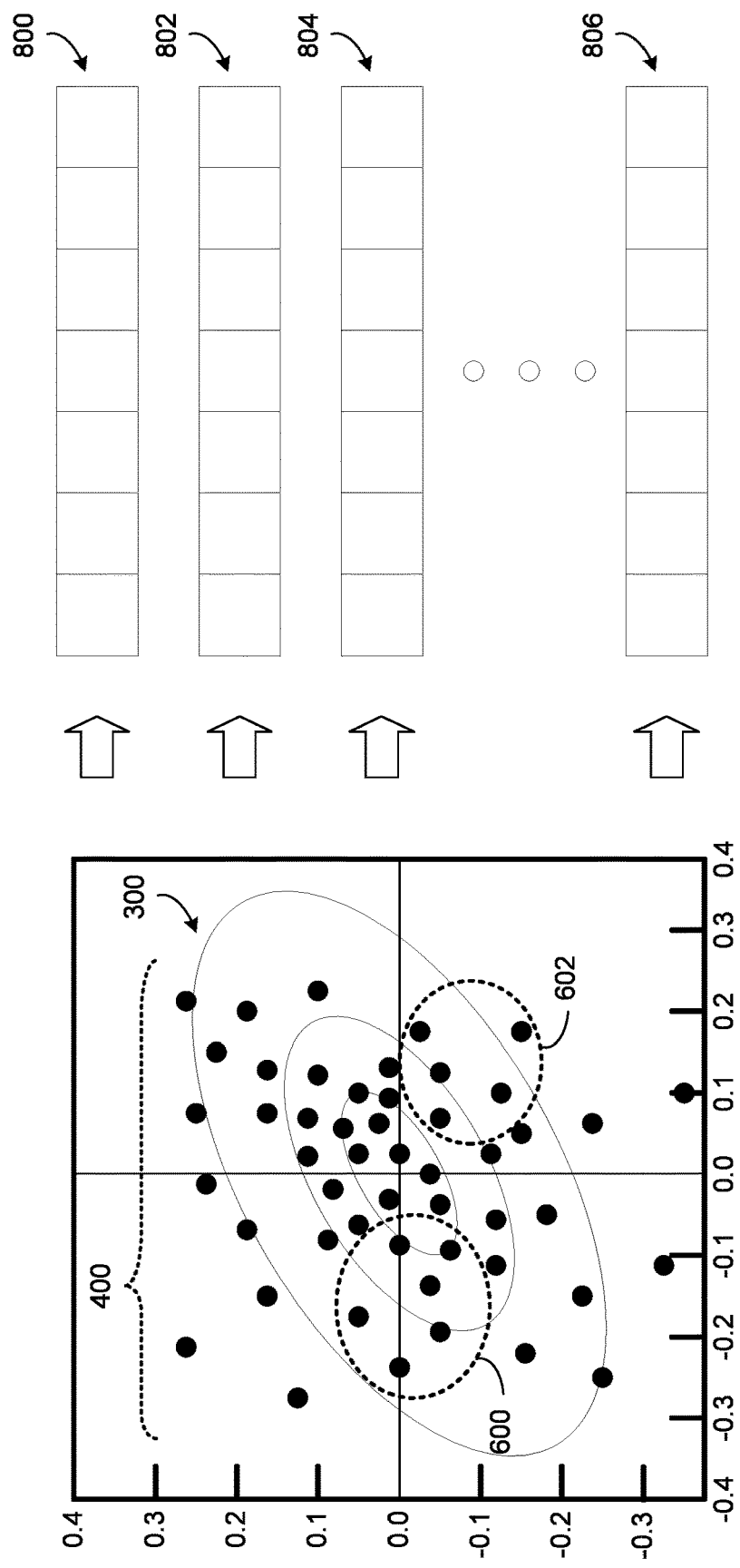
FIG. 8 is a diagrammatic view of the generation of synthetic biometric profiles in accordance with one implementation of the synthetic profile generation process.

Referring also to FIG. 8, suppose synthetic profile generation process 10 generates a plurality of random samples (e.g., plurality of random samples 400) from statistical model 300 and model of variability 600 and model of variability 602. As discussed above, plurality of random samples 400 has the same distribution as plurality of natural biometric profiles 200, 202, 204, 206 using statistical model 300. Model of variability 600 has the modeled distribution of variability in the natural biometric profiles for one individual while model of variability 602 has the modeled distribution of variability in the natural biometric profiles for another individual. With plurality of random samples 400, model of variability 600, and model of variability 602, synthetic profile generation process 10 generates a plurality of synthetic biometric profiles (e.g., synthetic biometric profiles 800, 802, 804, 806). In this example, each synthetic biometric profile includes biometric information that fits statistical model 300, model of variability 600, and model of variability 602, but is not attributable to an actual person or set of people.

Figure 9:
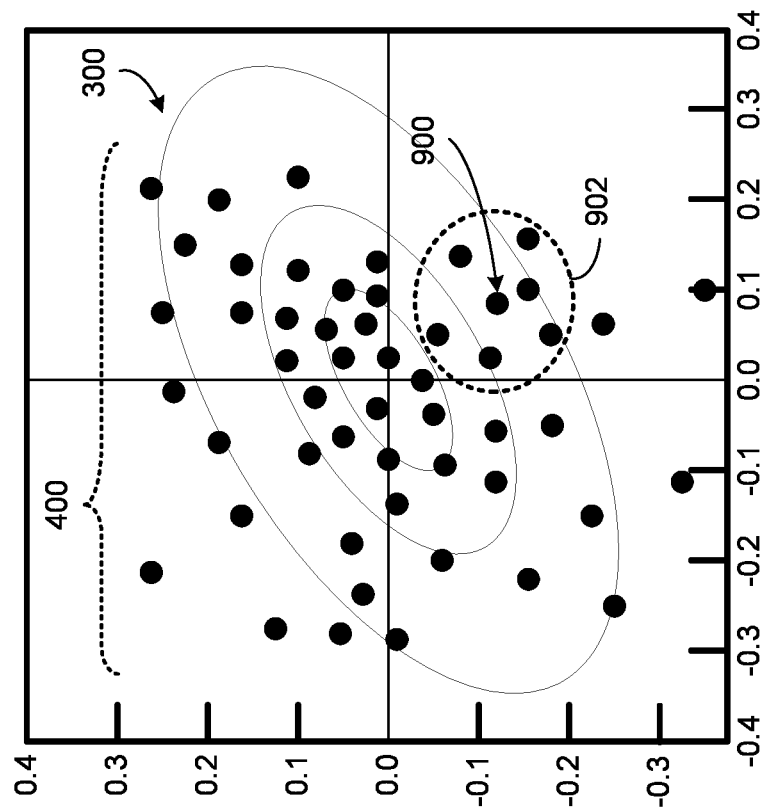
FIGS. 9-10 are diagrammatic views of models of the clustering of natural biometric profiles in accordance with various implementation of the synthetic profile generation process.

In some implementations, synthetic profile generation process 10 uses a statistical model of variability to generate a synthetic biometric profile. For example, for each randomly generated point or vector of statistical model 300, synthetic profile generation process 10 samples points or vectors randomly from the statistical model of variability using the randomly generated point as the center point or reference point. Referring also to FIG. 9, suppose synthetic profile generation process 10 generates statistical model 300 and random samples 400. Synthetic profile generation process 10 generates 104 a synthetic biometric profile using a random sample (e.g., random sample 900) from statistical model 300 and model of variability 902 set about random sample 900. In this example, random point 900 serves as the center point or reference point for vectors synthetically representing natural biometric profiles.

In some implementations, synthetic profile generation process 10 clusters 112 a set of natural biometric profiles. Clustering a set of natural biometric profiles includes identifying a set of biometric profiles from the plurality of biometric profiles to use as the basis for synthetic biometric profiles. For example, suppose the plurality of natural biometric profiles includes 10,000 individual natural biometric profiles. Instead of generating 10,000 corresponding synthetic biometric profiles, which may involve significant processing resources, synthetic profile generation process 10 identifies a set of natural biometric profiles to use as a cluster of natural biometric profiles. As discussed above, each natural biometric profile is a vector (e.g., I-vector, X-vector, embedding, etc.). Accordingly, synthetic profile generation process 10 clusters a set of natural biometric profiles by determining an average or composite representation of the identified set of natural biometric profiles. In one example, synthetic profile generation process 10 clusters 112 a nearest set of five natural biometric profiles into a cluster (e.g., where nearness is based on numerical distance as shown in FIG. 9).

Figure 10:
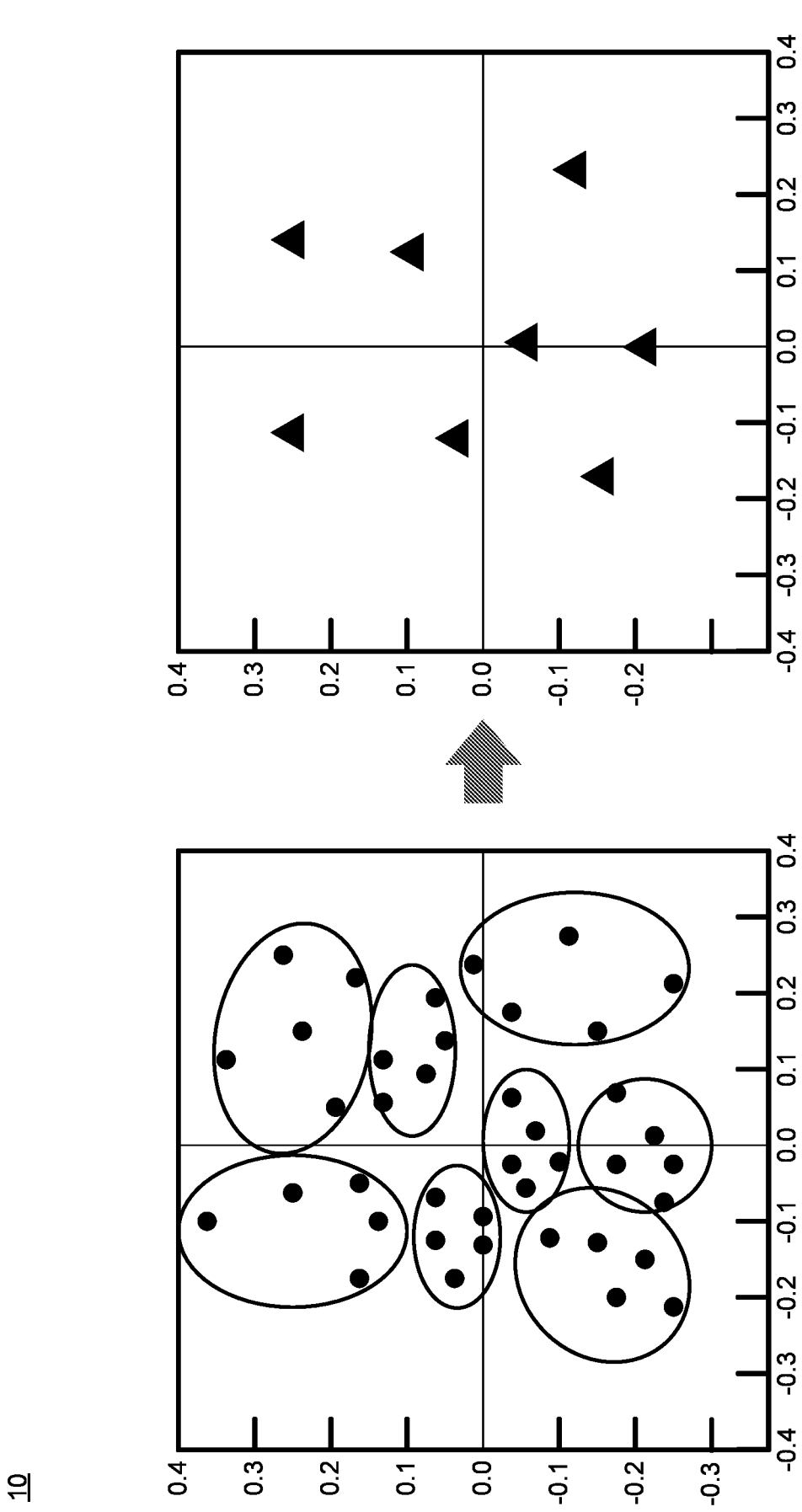

In some implementations, generating 104 the plurality of synthetic biometric profiles includes generating 114 a synthetic biometric profile using the clustered set of natural biometric profiles. Referring also to FIG. 10, suppose synthetic profile generation process 10 clusters 112 a plurality of natural biometric profiles into eight clusters of five natural biometric profiles each. From the eight clusters of five proximate natural biometric profiles, synthetic profile generation process 10 generates eight representative biometric profiles (e.g., shown as triangles in the graph of FIG. 10). As discussed above, synthetic profile generation process 10 generates 100 a statistical model representing the plurality of representative biometric profiles and a model of variability in the natural biometric profiles associated with the same individual. From the statistical model and the model of variability, synthetic profile generation process 10 generates a plurality of synthetic biometric profiles by generating random samples from the statistical model. In this example, synthetic profile generation process 10 generates a plurality of clustered synthetic biometric profiles in a resource-efficient manner (i.e., by clustering natural biometric profiles in a subset of representative biometric profiles to reduce the number of synthetic biometric profiles created).

In some implementations, synthetic profile generation process 10 disposes 116 of the plurality of natural biometric profiles in response to generating the plurality of synthetic biometric profiles. For example, synthetic profile generation process 10 generates 100 plurality of synthetic biometric profiles 800, 802, 804, 806 to include the distribution of features or properties of biometric information defined by statistical model 300 without including biometric information from plurality of natural biometric profiles 200, 202, 204, 206. In this manner, synthetic profile generation process 10 is able to process target biometric information using plurality of synthetic biometric profiles 800, 802, 804, 806 that include the same distribution of features as plurality of natural biometric profiles 200, 202, 204, 206 without exposing plurality of natural biometric profiles 200, 202, 204, 206.

Accordingly and in response to generating synthetic biometric profiles 800, 802, 804, 806, synthetic profile generation process 10 disposes 116 of plurality of natural biometric profiles 200, 202, 204, 206. In one example, disposing 116 of natural biometric profiles includes deleting or otherwise removing natural biometric profiles from a storage device or other computing device. In this example, the natural biometric profiles are deleted which provides the highest level of adherence to various privacy laws, regulations, and other restrictions concerning sensitive content (i.e., biometric information associated with a particular individual).

In another example, disposing 116 of natural biometric profiles includes removing natural biometric profiles from inclusion or use by a biometric verification system. In this example, biometric information from natural biometric profiles is used to generate the statistical model but can be retained for other uses (e.g., data augmentation, speech processing (in the case of voice biometric information), image processing (in the case of retinal or face print biometric information), etc.).

In some implementations, synthetic profile generation process 10 trains 118 a biometric classification system using the plurality of synthetic biometric profiles. A biometric verification system is a hardware and/or software system that verifies and/or identifies individuals using unique biometric characteristics. For example, biometric profiles associated with particular individuals are enrolled in the biometric verification system such that target biometric information is compared to each enrolled biometric profile for verification or identification. In some implementations, when comparing target biometric information to the enrolled biometric profiles, the biometric verification system generates a recognition score. In some implementations, synthetic profile generation process 10 uses the plurality of synthetic biometric profiles to train the biometric verification system. In this manner, the biometric verification system is trained 118 with the plurality of synthetic biometric profiles without exposing the biometric information of the plurality of natural biometric profiles. For training an accurate backend classifier (e.g., biometric verification system), the training data should (statistically) match as much as possible the data that will arrive during use at run-time. Given this desire to match training data with actual data, synthetic profile generation process 10 simulates the same statistical space of the training data with synthetic data so that the backend is trained to cover the same space (and same distribution inside that space), to get the best possible recognition accuracy.

Figure 11:
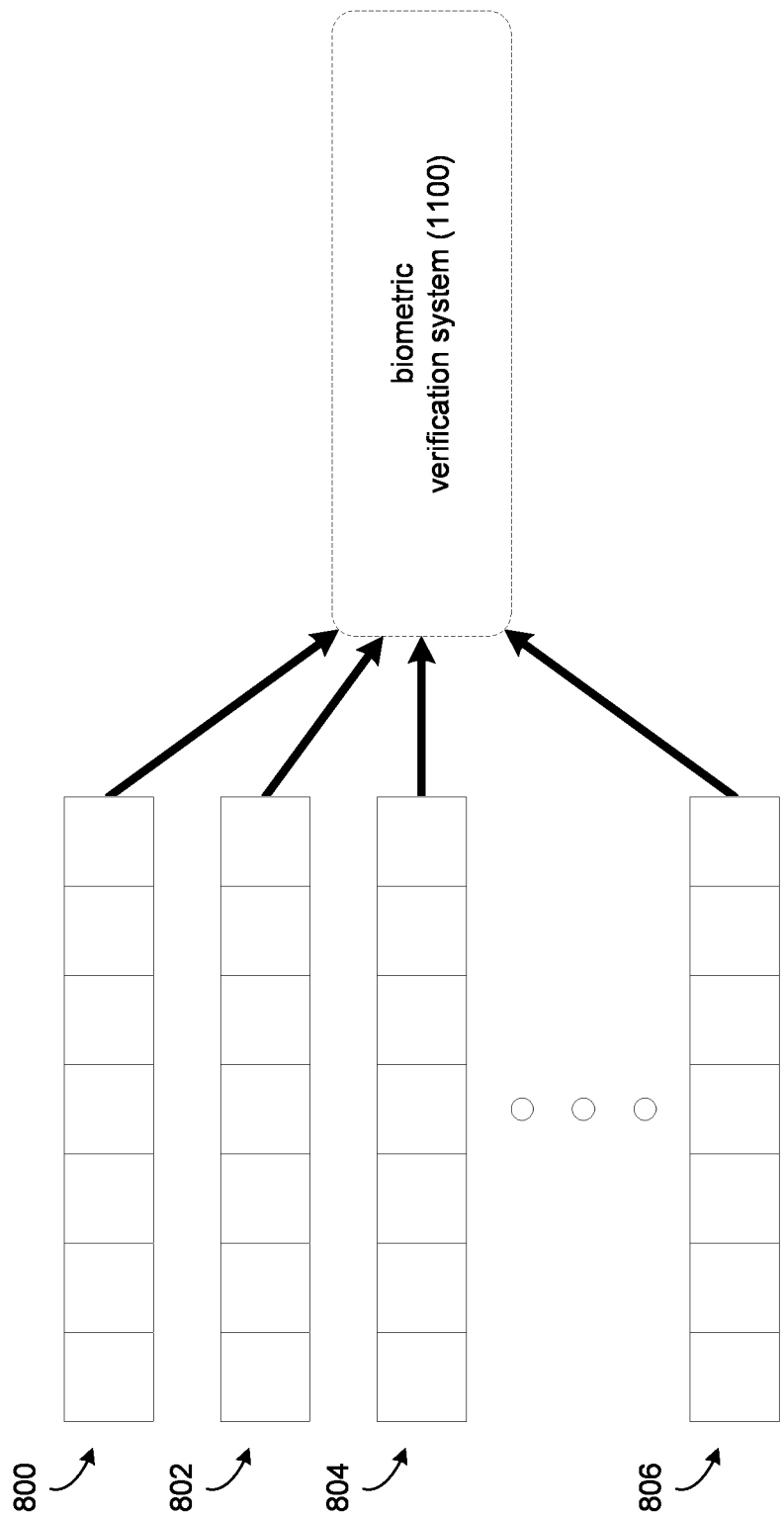
FIG. 11 is a diagrammatic view of the training of a biometric verification system in accordance with one implementation of the synthetic profile generation process.

Referring also to FIG. 11, suppose synthetic profile generation process 10 generates 104 plurality of synthetic biometric profiles 800, 802, 804, 806. In this example, synthetic profile generation process 10 uses plurality of synthetic biometric profiles 800, 802, 804, 806 to train 118 a biometric verification system (e.g., biometric verification system 1100).

In some implementations, the accuracy of a biometric verification system that is trained with synthetic biometric profiles, generated in the above-described manner, is minimally degraded compared to the accuracy observed when using natural biometric profiles. In one example, suppose nine biometric verification models are trained using 330,000 utterances from 15,000 speakers (e.g., plurality of natural biometric profiles) and a plurality of synthetic biometric profiles clustered in 3,000 groups. In this example, the results are reported in Table 1 below in terms of Equal Error Rate (EER) and False Rejection Rate (FR) at two False Acceptance (FA) values, 1% and 0.5%.

TABLE 1

|  | EER % | FR @ FA = 1% | FR @ FA = 0.5% |
| --- | --- | --- | --- |
| Training with real-data | 3.28 | 7.04 | 9.64 |
| Training with synthetic data | 3.46 | 7.60 | 10.19 |

As shown above in Table 1, the average accuracy degradation is about 5.5% for EER, about 8% for FR@FA=1%, and about 6% for FR@FA=0.5%. Accordingly, the accuracy degradation resulting from using synthetic biometric profiles is limited while safeguarding private biometric data from being used in the training of biometric verification systems.

Figure 12:
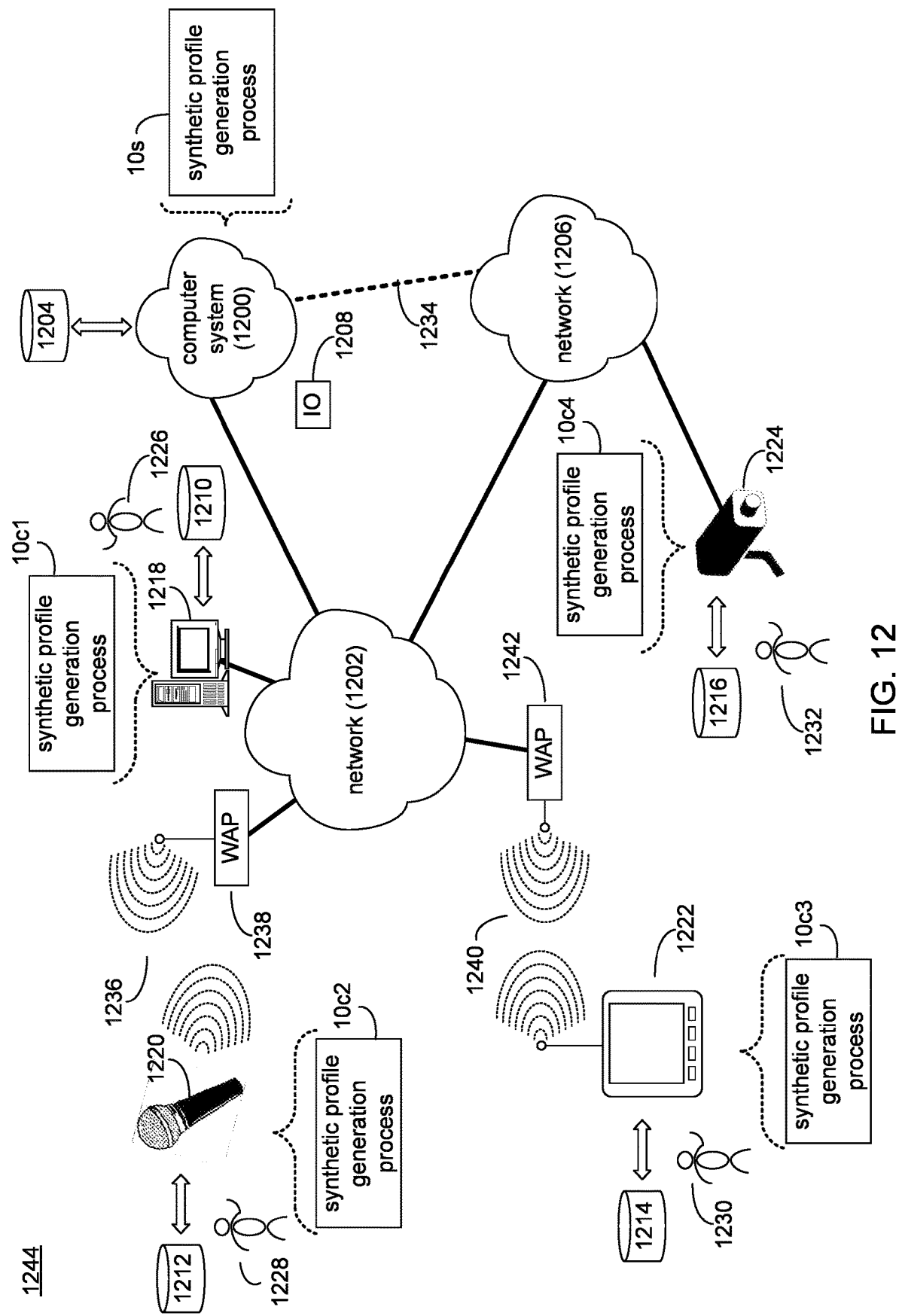
FIG. 12 is a diagrammatic view of a computer system and the synthetic profile generation process coupled to a distributed computing network.

System Overview:

Referring to FIG. 12, there is shown synthetic profile generation process 10. Synthetic profile generation process 10 may be implemented as a server-side process, a client-side process, or a hybrid server-side/client-side process. For example, synthetic profile generation process 10 may be implemented as a purely server-side process via synthetic profile generation process 10s. Alternatively, synthetic profile generation process 10 may be implemented as a purely client-side process via one or more of synthetic profile generation process 10c1, synthetic profile generation process 10c2, synthetic profile generation process 10c3, and synthetic profile generation process 10c4. Alternatively still, synthetic profile generation process 10 may be implemented as a hybrid server-side/client-side process via synthetic profile generation process 10s in combination with one or more of synthetic profile generation process 10c1, synthetic profile generation process 10c2, synthetic profile generation process 10c3, and synthetic profile generation process 10c4.

Accordingly, synthetic profile generation process 10 as used in this disclosure may include any combination of synthetic profile generation process 10s, synthetic profile generation process 10c1, synthetic profile generation process 10c2, synthetic profile generation process 10c3, and synthetic profile generation process 10c4.

Synthetic profile generation process 10s may be a server application and may reside on and may be executed by a computer system 1200, which may be connected to network 1202 (e.g., the Internet or a local area network). Computer system 1200 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a mini computer, a mainframe computer, a RAID device and a NAS system. The various components of computer system 1200 may execute one or more operating systems.

The instruction sets and subroutines of synthetic profile generation process 10s, which may be stored on storage device 1204 coupled to computer system 1200, may be executed by one or more processors (not shown) and one or more memory architectures (not shown) included within computer system 1200. Examples of storage device 1204 may include but are not limited to: a hard disk drive; a RAID device; a random access memory (RAM); a read-only memory (ROM); and all forms of flash memory storage devices.

Network 1202 may be connected to one or more secondary networks (e.g., network 1204), examples of which may include but are not limited to: a local area network; a wide area network; or an intranet, for example.

Various IO requests (e.g., IO request 1208) may be sent from synthetic profile generation process 10s, synthetic profile generation process 10c1, synthetic profile generation process 10c2, synthetic profile generation process 10c3 and/or synthetic profile generation process 10c4 to computer system 1200. Examples of IO request 1208 may include but are not limited to data write requests (i.e., a request that content be written to computer system 1200) and data read requests (i.e., a request that content be read from computer system 1200).

The instruction sets and subroutines of synthetic profile generation process 10c1, synthetic profile generation process 10c2, synthetic profile generation process 10c3 and/or synthetic profile generation process 10c4, which may be stored on storage devices 1210, 1212, 1214, 1216 (respectively) coupled to client electronic devices 1218, 1220, 1222, 1224 (respectively), may be executed by one or more processors (not shown) and one or more memory architectures (not shown) incorporated into client electronic devices 1218, 1220, 1222, 1224 (respectively). Storage devices 1210, 1212, 1214, 1216 may include but are not limited to: hard disk drives; optical drives; RAID devices; random access memories (RAM); read-only memories (ROM), and all forms of flash memory storage devices. Examples of client electronic devices 1218, 1220, 1222, 1224 may include, but are not limited to, personal computing device 1218 (e.g., a smart phone, a personal digital assistant, a laptop computer, a notebook computer, and a desktop computer), audio input device 1220 (e.g., a handheld microphone, a lapel microphone, an embedded microphone (such as those embedded within eyeglasses, smart phones, tablet computers and/or watches) and an audio recording device), display device 1222 (e.g., a tablet computer, a computer monitor, and a smart television), machine vision input device 1224 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 1226, 1228, 1230, 1232 may access computer system 1200 directly through network 1202 or through secondary network 1206. Further, computer system 1200 may be connected to network 1202 through secondary network 1206, as illustrated with link line 1234.

The various client electronic devices (e.g., client electronic devices 1218, 1220, 1222, 1224) may be directly or indirectly coupled to network 1202 (or network 1206). For example, personal computing device 1218 is shown directly coupled to network 1202 via a hardwired network connection. Further, machine vision input device 1224 is shown directly coupled to network 1206 via a hardwired network connection. Audio input device 1222 is shown wirelessly coupled to network 1202 via wireless communication channel 1236 established between audio input device 1220 and wireless access point (i.e., WAP) 1238, which is shown directly coupled to network 1202. WAP 1238 may be, for example, an IEEE 802.11a, 802.11b, 802.11g, 802.11n, Wi-Fi™, and/or Bluetooth™ device that is capable of establishing wireless communication channel 1236 between audio input device 1220 and WAP 1238. Display device 1222 is shown wirelessly coupled to network 1202 via wireless communication channel 1240 established between display device 1222 and WAP 1242, which is shown directly coupled to network 1202.

The various client electronic devices (e.g., client electronic devices 1218, 1220, 1222, 1224) may each execute an operating system, wherein the combination of the various client electronic devices (e.g., client electronic devices 1218, 1220, 1222, 1224) and computer system 1200 may form modular system 1244.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
generating a statistical model representative of a plurality of natural biometric profiles, wherein each individual natural biometric profile of the plurality of natural biometric profiles is associated with an individual;
generating a model of variability in the individual natural biometric profile associated with the individual, including generating a statistical model of variability in the individual natural biometric profile; and
generating a plurality of synthetic biometric profiles using the model of variability and a plurality of random samples generated from the statistical model.

2. The computer-implemented method of claim 1, wherein each natural biometric profile includes a vector of biometric information associated with the individual.

3. The computer-implemented method of claim 1, wherein generating the statistical model includes generating a plurality of statistical models for a plurality of biometric characteristics.

4. The computer-implemented method of claim 1, further comprising:
   disposing of the plurality of natural biometric profiles in response to generating the plurality of synthetic biometric profiles.

5. The computer-implemented method of claim 1, wherein generating the model of variability in the individual natural biometric profile associated with the individual includes directly reproducing a relative variability in the individual natural biometric profile associated with the individual.

6. The computer-implemented method of claim 1, further comprising:
   clustering a set of natural biometric profiles.

7. The computer-implemented method of claim 6, wherein generating the plurality of synthetic biometric profiles includes generating a synthetic biometric profile using the clustered set of natural biometric profiles.

8. The computer-implemented method of claim 1, further comprising:
   training a biometric classification system using the plurality of synthetic biometric profiles.

9. A computing system comprising:
   a memory; and
   a processor to generate a statistical model representative of a plurality of voiceprints, wherein each individual voiceprint is associated with an individual, to generate a model of variability in the individual voiceprint associated with the individual, including by directly reproducing a relative variability in the individual voiceprint, and to generate a plurality of synthetic voiceprints using the model of variability and a plurality of random samples generated from the statistical model.

10. The computing system of claim 9, wherein each voiceprint includes a vector of voiceprint information associated with the individual.

11. The computing system of claim 9, wherein generating the statistical model includes generating a plurality of statistical models for a plurality of voice characteristics.

12. The computing system of claim 9, wherein the statistical model is a multivariate Gaussian distribution.

13. The computing system of claim 9, wherein the statistical model is a Gaussian Mixture Model.

14. The computing system of claim 9, wherein the processor is further configured to:
   dispose of the plurality of voiceprints in response to generating the plurality of synthetic voiceprints.

15. A computer program product residing on a non-transitory computer readable medium having a plurality of instructions stored thereon which, when executed by a processor, cause the processor to perform operations comprising:
   generating a statistical model representative of a plurality of natural biometric profiles, wherein each natural biometric profile is associated with an individual;
   generating a model of variability in the natural biometric profile associated with the individual, including generating a statistical model of variability in the natural biometric profile associated with the individual;
   generating a plurality of synthetic biometric profiles using the model of variability and a plurality of random samples generated from the statistical model; and
   training a biometric verification system using the plurality of synthetic biometric profiles.

16. The computer program product of claim 15, wherein each natural biometric profile includes a vector of natural biometric profile information associated with the individual.

17. The computer program product of claim 15, wherein generating the statistical model includes generating a plurality of statistical models for a plurality of natural biometric characteristics.

18. The computer program product of claim 15, wherein the statistical model is a multivariate Gaussian distribution.

19. The computer program product of claim 15, wherein the statistical model is a Gaussian Mixture Model.

20. The computer program product of claim 15, wherein the operations further comprise:
   disposing of the plurality of natural biometric profiles in response to generating the plurality of synthetic biometric profiles.

* * * * *